United States Patent
He et al.

(10) Patent No.: US 12,160,836 B2
(45) Date of Patent: Dec. 3, 2024

(54) POWER HEADROOM REPORT FOR SIDELINKS IN DUAL CONNECTIVITY CONFIGURATION

(71) Applicant: QUALCOMM Incorporated, San Diego, CA (US)

(72) Inventors: Linhai He, San Diego, CA (US); Seyedkianoush Hosseini, San Diego, CA (US); Wanshi Chen, San Diego, CA (US); Tingfang Ji, San Diego, CA (US); Hwan Joon Kwon, San Diego, CA (US); Karthika Paladugu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/366,928

(22) Filed: Jul. 2, 2021

(65) Prior Publication Data
US 2022/0095243 A1 Mar. 24, 2022

Related U.S. Application Data

(60) Provisional application No. 63/081,218, filed on Sep. 21, 2020.

(51) Int. Cl.
*H04W 52/36* (2009.01)
*H04W 52/24* (2009.01)
(Continued)

(52) U.S. Cl.
CPC ....... *H04W 52/365* (2013.01); *H04W 52/242* (2013.01); *H04W 76/15* (2018.02); *H04W 80/02* (2013.01)

(58) Field of Classification Search
CPC . H04W 52/365; H04W 52/242; H04W 76/15; H04W 80/02; H04W 52/346; H04W 92/18; H04W 52/383
See application file for complete search history.

(56) References Cited

U.S. PATENT DOCUMENTS 10,383,067 B2    8/2019  Lin et al.
10,798,663 B2 *  10/2020 Zhang ................. H04W 52/146
(Continued)

FOREIGN PATENT DOCUMENTS

| EP | 3863343 A1 | 8/2021 |
|---|---|---|
| WO | WO-2020088679 A1 | 5/2020 |

OTHER PUBLICATIONS

Ericsson: "Measurements, Signaling, and Selection Rules for Relay Discovery", 3GPP Draft, R1-151767, 3GPP TSG RAN WG1 Meeting #80bis, Relay Selection Rules, 3rd Generation Partnership Project (3GPP), Mobile Competence Centre, 650, Route Des Lucioles, F-06921 Sophia-Antipolis Cedex, France, vol. RAN WG1, no. Belgrade, Serbia, Apr. 20, 2015-Apr. 24, 2015, Apr. 19, 2015 (Apr. 19, 2015), 7 Pages, XP050934628, Retrieved from the Internet: URL:http://www.3gpp.org/ftp/Meetings_3GPP SYNC/RAN1/Docs/ [retrieved on Apr. 19, 2015], the whole document.

(Continued)

*Primary Examiner* — Kibrom T Hailu
(74) *Attorney, Agent, or Firm* — Holland & Hart LLP

(57) ABSTRACT

Methods, systems, and devices for wireless communications are described. A user equipment (UE) may identify a dual connectivity configuration for a plurality of communication links, where at least one communication link of the plurality of communication links includes a sidelink. The UE may transmit a report based on an event associated with the sidelink. In some cases, the UE may determine the event associated with the sidelink based on identifying an activation of the at least one additional sidelink carrier, establish- (Continued)

ing a relay communication link between the UE and a relay network node, measuring a set of path loss values, determining a minimum path loss value of the measured set of path loss values, determining a backoff value for one or more sidelink carriers, or any combination thereof.

28 Claims, 12 Drawing Sheets

(51) Int. Cl.
*H04W 76/15* (2018.01)
*H04W 80/02* (2009.01)

(56) References Cited

U.S. PATENT DOCUMENTS

| | | | |
|---|---|---|---|
| 11,265,822 B2* | 3/2022 | Ryu | H04W 52/383 |
| 2011/0092217 A1 | 4/2011 | Kim et al. | |
| 2012/0040707 A1 | 2/2012 | Kim et al. | |
| 2012/0207112 A1 | 8/2012 | Kim et al. | |
| 2016/0088624 A1 | 3/2016 | Lee et al. | |
| 2020/0267621 A1* | 8/2020 | Jiang | H04W 28/0268 |
| 2020/0288411 A1 | 9/2020 | Liu et al. | |
| 2021/0105790 A1 | 4/2021 | Lin | |
| 2022/0086768 A1* | 3/2022 | Yeo | H04W 52/242 |
| 2022/0095244 A1 | 3/2022 | He et al. | |
| 2022/0210749 A1* | 6/2022 | Jang | H04W 24/10 |
| 2023/0041866 A1* | 2/2023 | Yi | H04W 52/383 |

OTHER PUBLICATIONS

Huawei, et al., "Power Control and Power Sharing for V2X Sidelink", 3GPP Draft, 3GPP TSG RAN WG1 Meeting #97, R1-1906598, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728049, 6 pages, Retrieved from the Internet: URL: http://www.3gpp.org/ftp/Meetings%5F3GPP%5FSYNC/RAN1/Docs/R1%2D1906598%2Ezip [retrieved on May 13, 2019] pp. 1-5, the whole document.
International Search Report and Written Opinion—PCT/US2021/049447—ISA/EPO—Feb. 16, 2022 (206494B1WO).
3GPP: "3rd Generation Partnership Project, Technical Specification Group Radio Access Network, NR, Medium Access Control (MAC) Protocol Specification (Release 16)", 3GPP Standard, Technical Specification, 3GPP TS 38.321, 3rd Generation Partnership Project, Mobile Competence Centre, 650, Route Des Lucioles, F-06921 Sophia-Antipolis Cedex, France, vol. RAN WG2, No. V16.1.0, Jul. 24, 2020, pp. 1-151, XP051925832.

\* cited by examiner

| b0 | b1 | b2 | b3 | b4 | b5 | b6 | b7 |
|---|---|---|---|---|---|---|---|
| R 305-a | R 305-b | \multicolumn{6}{c}{Power Headroom Value 310-a} | | | | | |
| R 305-c | R 305-d | \multicolumn{6}{c}{Max Transmit Power 315-a} | | | | | |

| b0 | b1 | b2 | b3 | b4 | b5 | b6 | b7 |
|---|---|---|---|---|---|---|---|
| C 320-g | C 320-f | C 320-e | C 320-d | C 320-c | C 320-b | C 320-a | R 305-e |
| P 325-a | V 330-a | Power Headroom Value for Carrier #1 310-b | | | | | |
| R 305-f | R 305-g | Max Transmit Power for Carrier #1 315-b | | | | | |
| | | | | | | | |
|---|---|---|---|---|---|---|---|
| P 325-b | V 330-b | Power Headroom Value for Carrier #N 310-c | | | | | |
| R 305-h | R 305-i | Max Transmit Power for Carrier #N 315-c | | | | | |

| | b0 | b1 | b2 | b3 | b4 | b5 | b6 | b7 |
|---|---|---|---|---|---|---|---|---|
| | R 405-a | R 405-b | Cell ID For Relay #1 410-a | | | | | |
| | C 425-g | C 425-f | C 425-e | C 425-d | C 425-c | C 425-b | C 425-a | R 405-c |
| | P 430-a | V 435-a | Power Headroom Value for Carrier #1 415-a | | | | | |
| | R 405-d | R 405-e | Max Transmit Power for Carrier #1 420-a | | | | | |

⋮

| | b0 | b1 | b2 | b3 | b4 | b5 | b6 | b7 |
|---|---|---|---|---|---|---|---|---|
| | R 405-f | R 405-g | Cell ID For Relay #2 410-b | | | | | |
| | C 410-n | C 410-m | C 410-l | C 410-k | C 410-j | C 410-i | C 410-h | R 405-f |
| | P 430-b | V 435-b | Power Headroom Value for Carrier #N 415-b | | | | | |
| | R 405-g | R 405-h | Max Transmit Power for Carrier #N 420-b | | | | | |

POWER HEADROOM REPORT FOR SIDELINKS IN DUAL CONNECTIVITY CONFIGURATION

CROSS REFERENCE

The present application for patent claims the benefit of U.S. Provisional Patent Application No. 63/081,218 by He et al., entitled "POWER HEADROOM REPORT FOR SIDE-LINKS IN DUAL CONNECTIVITY CONFIGURATION," filed Sep. 21, 2020, assigned to the assignee hereof, and expressly incorporated by reference herein.

FIELD OF TECHNOLOGY

The following relates to wireless communications, including power headroom report for sidelinks in dual connectivity configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE may be configured to operate on multiple communication links as part of a dual connectivity configuration. The UE may also be configured to provide a power headroom report including power headroom information to a base station, which the base station may use to schedule and allocate resources for the UE. For example, the UE may generate power headroom information for multiple communication links. In some cases, the UE may inefficiently provide power headroom information corresponding to one or more communication links. It therefore may be desirable to provide improvements to power headroom information reporting.

SUMMARY

Various aspects of the described techniques relate to configuring a communication device, which may be a UE to support power headroom reporting with respect to an access link with a base station (e.g., an eNodeB (eNB), a giga-NodeB (gNB)) or a sidelink with another UE, or both. To support improvements to power headroom reporting for sidelinks in a dual connectivity configuration, aspects are described for providing an indication of power headroom information for each sidelink associated with the UE. For example, the UE may communicate with multiple base stations via multiple communication links as part of a dual connectivity configuration, and the UE may transmit, to each base station, a power headroom report including an indication of power headroom information associated with each communication link.

The UE may be configured to identify a dual connectivity configuration for a set of communication links, where at least one communication link of the set of communication links includes a sidelink. In some examples, the UE may determine an event associated with the sidelink that triggers a power headroom report and transmit the power headroom based on the determined event associated with the sidelink. In some examples, the UE may be configured to determine the event associated with the sidelink based on identifying an activation of at least one additional sidelink carrier, establishing a relay communication link between the UE and a relay network node, measuring a set of path loss values, determining a minimum path loss value of the measured set of path loss values, or determining a backoff value for one or more sidelink carriers, or any combination thereof. The described techniques may, as a result, include features for improvements to sidelink operations and, in some examples, may promote high reliability and low latency sidelink communications, among other benefits.

BRIEF DESCRIPTION OF THE DRAWINGS

FIG. 4 illustrates an example of a sidelink power headroom report message that supports power headroom report for sidelinks in dual connectivity configuration in accordance with aspects of the present disclosure.

DETAILED DESCRIPTION

Figure 1:
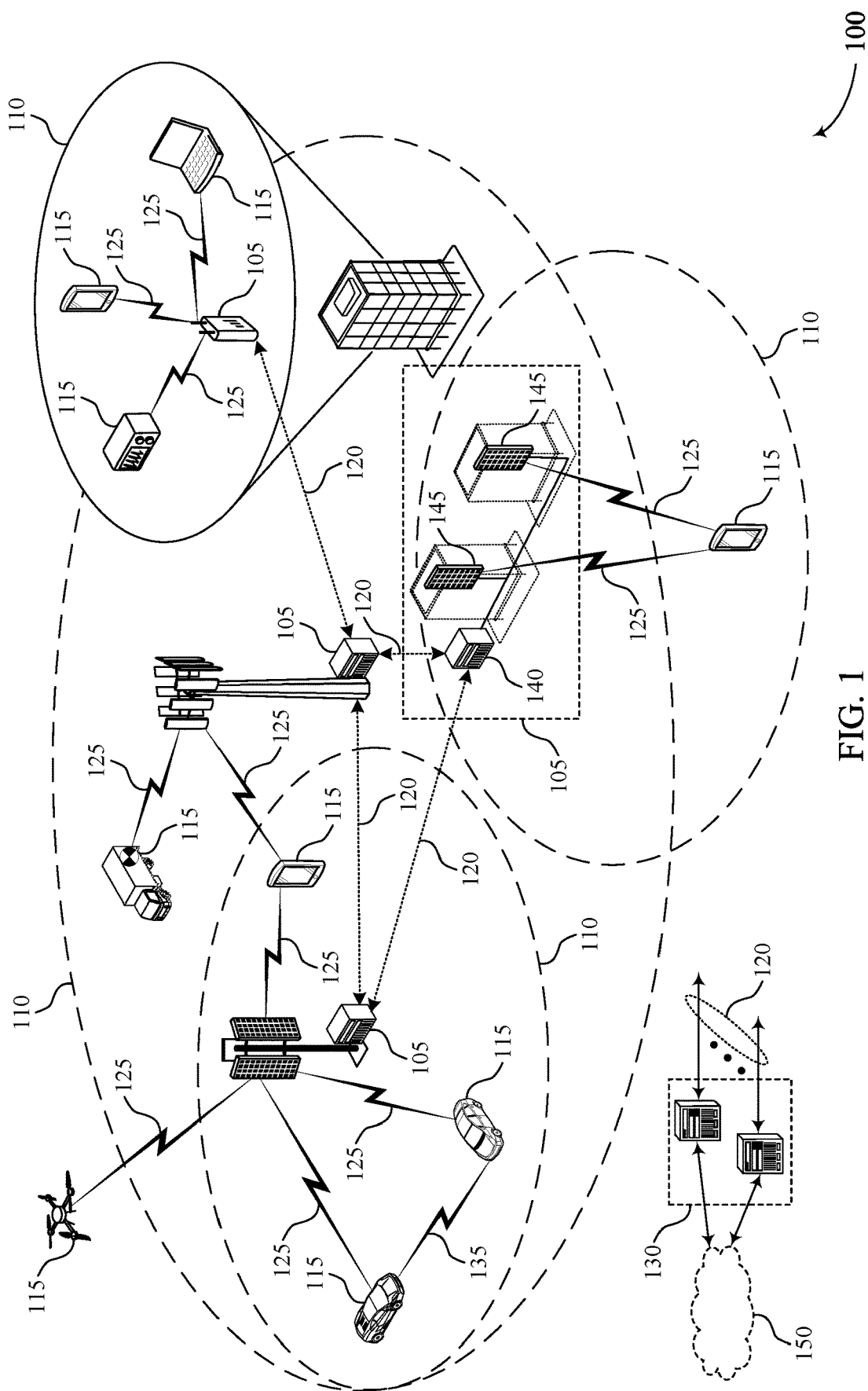
FIGS. 1 and 2 illustrate example of wireless communications systems that support power headroom report for sidelinks in dual connectivity configuration in accordance with aspects of the present disclosure.

A wireless communications system may include communication devices, such as a UE and a base station (e.g., an eNB, a gNB, or some other base station), that support wireless communications over one or multiple radio access technologies. Examples of radio access technologies include 4G systems, such as LTE systems, and 5G systems, which may be referred to as NR systems. The wireless communications between a UE and a base station in the wireless communications system, for example, may occur over a communication link referred to as an access link (e.g., a Uu interface). In some cases, the UE may be configured to operate on multiple communication links in a dual-connectivity mode. The UE may communicate with two or more cells (e.g., two or more base stations) using different frequency resources (e.g., subcarriers, carriers). The UE may, in some cases, be associated with a maximum transmission power and a base station may schedule uplink transmissions for the UE. The base station may indicate a transmission power for uplink transmissions on a communication link. This may, however, fail to account for the transmission power of transmissions scheduled on additional communication links.

The wireless communications system may additionally, or alternatively, support sidelink communications between multiple UEs. Examples of sidelink communications may include, but are not limited to, device-to-device (D2D) communications, vehicle-based communications, which may also be referred to as vehicle-to-everything (V2X) communications systems, vehicle-to-vehicle (V2V) communications systems, cellular V2X (C-V2X) communications systems, and the like. Sidelink communications between at least two UEs in the wireless communications system, for example, may happen over a communication link referred to as a sidelink (e.g., a PC5 interface). In some cases, a base station may fail to consider transmission power for transmissions scheduled on sidelinks.

Various aspects of the present disclosure provide techniques for reporting power headroom information in the context of multiple communication links, multiple medium access control (MAC) entities, multiple cell groups, or multiple base stations. For example, a UE may identify a dual connectivity configuration for a set of communication links that includes at least one sidelink, and the UE may be configured for dynamic power sharing between a first subset of communication links that terminate at a first network node and a second subset of communication links that terminate at a second network node. The UE may determine an event trigger (e.g., a power headroom report trigger) associated with the sidelink. In some scenarios, the UE may receive a resource allocation on remote links (e.g., a mode-1 based resource allocation). For example, a base station may allocate dynamic or configured resources for sidelink transmissions between the UE and a relay node (e.g., a relay UE). Such scenarios may support a hybrid automatic repeat request (HARQ) procedure between the UE and the relay node.

In some cases, the dual connectivity configuration may support the UE in communicating with two or more cells or cell groups at one or more base stations. In some examples, a base station may support a first cell group (e.g., a master cell group) and a second cell group (e.g., a secondary cell group), while in some other examples, a first base station may support the first cell group and a second base station may support the second cell group. A dual connectivity configuration may support UEs in simultaneously transmitting and receiving data from one or more base stations, which may reduce system latency. In some cases, the UE may perform dynamic power sharing across the first cell group and the second cell group. For example, the UE may limit or reduce a transmit power for the first cell group to reserve transmit power for the second cell group. Dynamic power sharing may support the UE in managing transmit power across multiple cell groups such that the total transmit power (e.g., the sum of the transmit power for the first cell group and the transmit power for the second cell group) is below a transmit power threshold (e.g., a maximum transmit power). Dynamic power sharing may support the UE in operating in accordance with a transmit power threshold while in a dual connectivity configuration.

An event trigger may be based on a determined change in pathloss, an activation of a sidelink carrier, an establishment of a new relay, an expiration of a timer, a change in power backoff, or any combination thereof. The UE may determine one or more event triggers in the dual connectivity environment and transmit a sidelink power headroom report based on the determined event trigger. For example, the UE may measure pathloss values for multiple communication link, and the event trigger may be based on determining the a minimum pathloss value of the measured pathloss values. In some additional or alternative examples, the event trigger may be based on the UE identifying the activation of a sidelink carrier. In some cases, the UE may transmit the power headroom report over multiple communication links. For example, the UE may transmit a power headroom report across a first communication link to a base station and across a second communication link to a relay, and the relay may forward the power headroom report to the same base station or a different base station. In some examples, the UE may transmit the power headroom report across a first communication link to a first relay and across a second communication link to a second relay. The first and second relays may forward the power headroom reports to the same or different base stations. The UE may report power headroom information for multiple communication links or cell groups, which may improve transmission scheduling efficiency.

The UE may be configured, for example, to report power headroom information for all communication links or cell groups associated with the UE. For example, the UE may be associated with multiple communication links and each communication link may correspond to a cell group. The UE may generate a power headroom report for each communication link, and each power headroom report may include power headroom information for each carrier of the corresponding communication link. A communication link may be associated with one carrier (e.g., non-carrier aggregation (CA)) or multiple carriers (e.g., CA). In some examples, one or more cell groups of a dual connectivity configuration may also be configured for carrier aggregation. In such cases, the carriers of a cell group are managed by a same MAC entity.

In some examples, the UE may generate and transmit a power headroom report based on receiving one or more reference signals from a relay (e.g., another UE) and determining a minimum path loss value based on the one or more received reference signals. The UE may, alternatively, generate and transmit a power headroom report based on identifying an activation of a sidelink carrier for a communication link or cell group, establishing an additional communication link (e.g., sidelink) with a relay, or determining a backoff value for one or more sidelink carriers.

The multiple communication links may terminate at a same base station, or the UE may not be configured for dynamic power sharing. In such cases, a power headroom report may be transmitted across a number of communication links, and each power headroom report may include power headroom information corresponding to a cell group associated with the communication link that the power headroom report is transmitted across. In some cases, the UE may be configured for dynamic power sharing and the multiple communication links may terminate at different base stations. In such cases, each power headroom report may include power headroom information for each cell associated with the multiple communication links. For example, each power headroom report may include a number of cell identifiers and bitmaps, and each bitmap may indicate a power headroom value for each carrier of the corresponding cell. In some additional or alternative cases, each power headroom report may include power headroom information for a single cell and the base stations may communicate to determine power headroom information for all cells that are associated with the UE.

The present disclosure may, as a result, include features for improvements to sidelink operations and, in some examples, may promote high reliability and low latency sidelink communications, among other benefits. Aspects of the disclosure are initially described in the context of wireless communications systems. Aspects of the disclosure are then described with reference to sidelink power headroom report messages and a process flow. Aspects of the disclosure are further illustrated by and described with reference to apparatus diagrams, system diagrams, and flowcharts that relate to power headroom report for sidelinks in dual connectivity configuration.

FIG. 1 illustrates an example of a wireless communications system 100 that supports power headroom report for sidelinks in dual connectivity configuration in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots including one or more symbols. Excluding the cyclic prefix, each symbol period may include one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations. Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify a dual connectivity configuration for a set of communication links, where at least one communication link of the set of communication links includes a sidelink. The UE 115 may determine an event associated with the sidelink that triggers a power headroom report and transmit the power headroom report based on the determined event associated with the sidelink. In some cases, the UE 115 may determine the event associated with the sidelink based on identifying an activation of the at least one additional sidelink carrier, establishing a relay communication link between the UE 115 and a relay network node (e.g., another UE 115), measuring a set of path loss values, determining a minimum path loss value of the measured set of path loss values, determining a backoff value for one or more sidelink carriers, or any combination thereof.

Figure 2:
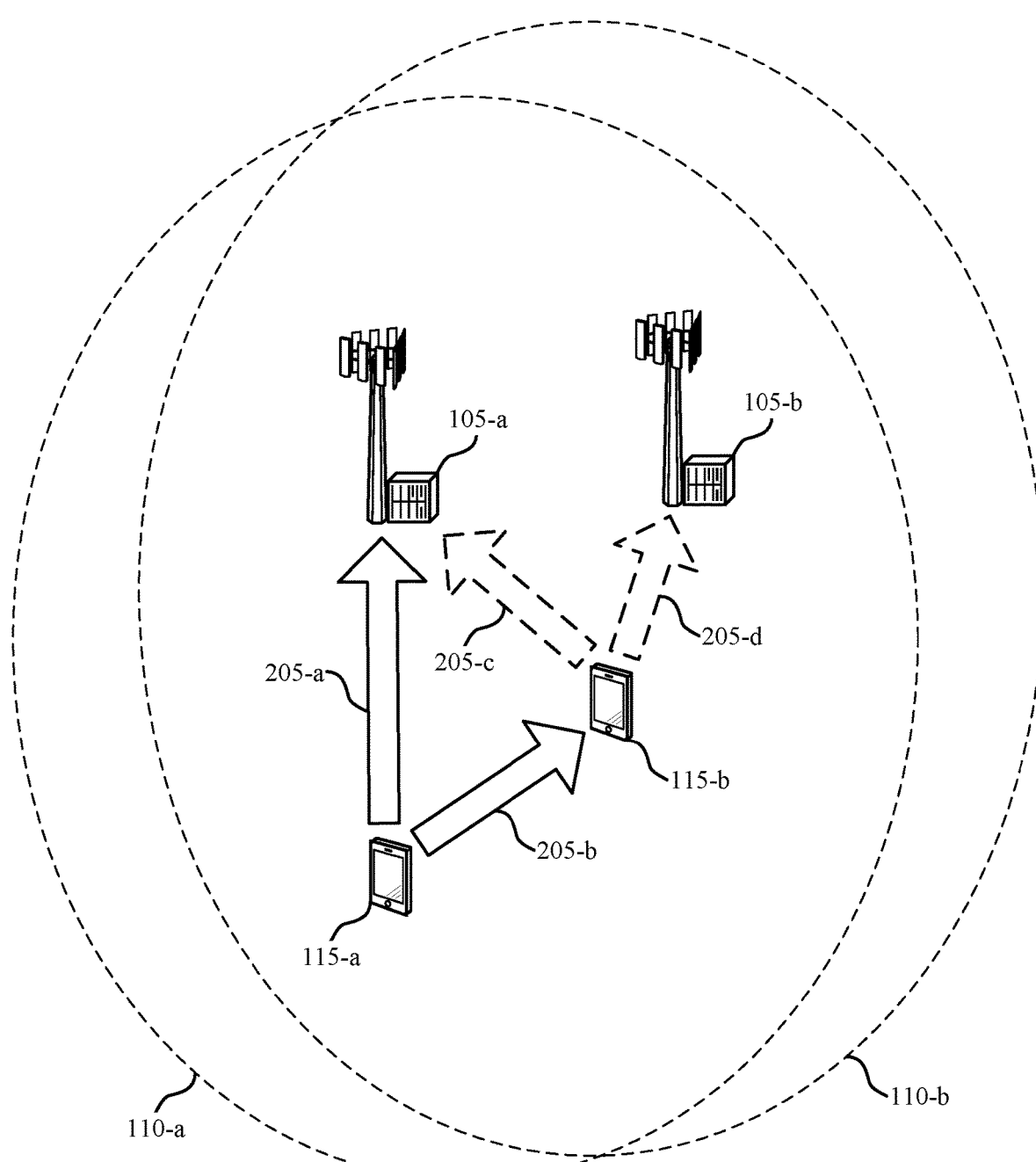

FIG. 2 illustrates an example of a wireless communications system 200 that supports power headroom report for sidelinks in dual connectivity configuration in accordance with aspects of the present disclosure. The wireless communications system 200 may implement aspects of the wireless communications system 100. For example, the wireless communications system 200 may include base stations 105-*a*, 105-*b* and UEs 115-*a*, 115-*b*, which may be examples of a base station 105 and a UE 115 as described with reference to FIG. 1. The wireless communications system 200 may support multiple radio access technologies including 4G systems such as LTE systems, LTE-A systems, or LTE-A Pro systems, and 5G systems which may be referred to as NR systems. The wireless communications system 200 may include features for improvements to power savings and, in some examples, may promote high reliability and low latency sidelink communications, among other benefits.

In the example of FIG. 2, each base station 105*a*-*a*, 105-*b* may be associated with a number of cells and a coverage area 110, and the UE 115-*a* (e.g., a remote UE) may communicate with the base stations 105-*a*, 105-*b* via one or more communication links 205. The UE 115-*a* may be within a coverage area 110-*a* of the base station 105-*a* and within a coverage area 110-*b* of the base station 105-*b*. In some other cases, the UE 115-*a* may be within the coverage area 110-*a* of the base station 105-*a* and outside of the coverage area 110-*b* of the base station 105-*b*. The UE 115-*a* may be associated with a set of communication links (e.g., a communication link 205-*a*, a communication link 205-*b*, a communication link 205-*c*, and/or a communication link 205-*d*). A first subset of the set of communication links may include the communication link 205-*a* that corresponds to a direct communication link (e.g., a Uu link, a Uu interface), and a second subset of the set of communication links may include the communication link 205-*b* that corresponds to a sidelink (e.g., a PC5 link, a PC5 interface, a remote link). The second subset of the set of communication links may additionally include a communication link (e.g., a relay communication link) that terminate at the base station 105-*a* or the base station 105-*b*. For example, the communication link 205-*c* may terminate at the base station 105-*a* and the communication link 205-*d* may terminate at the base station 105-*b*. A communication link 205 may be associated with one or more carriers.

The wireless communications system 200 may illustrate techniques for reporting power headroom information in the context of a dual connectivity configuration. For example, a UE 115 may report power headroom information to a base station 105 based on measuring pathloss values for multiple cells or cell groups. A UE 115 may additionally or alternatively report power headroom information to a base station 105 based on identifying the activation of a sidelink carrier or a cell. A UE 115 may report power headroom information across multiple links or cells, which may improve resource scheduling efficiency.

The UE 115-*a* may determine a sidelink power headroom report trigger associated with the sidelink (e.g., the communication link 205-*a*). The sidelink power headroom report trigger may be based on satisfying of one or more conditions. In some examples, the sidelink power headroom report trigger may be based on an expiration of a periodic timer. In some cases, the UE 115-*a* may be configured with a periodic timer as part of a control procedure (e.g., an RRC procedure), and the control procedure may indicate a time duration for the periodic timer. In some examples, the sidelink power headroom report trigger may be based on the UE 115-*a* receiving one or more path loss reference signals from the UE 115-*b* (e.g., a relay UE), measuring the one or more path loss reference signals, and determining a minimum path loss value of the one or more measured path loss reference signals. In some examples, the communication link 205-*b* may be associated with a carrier aggregation configuration, and the sidelink power headroom report trigger may be based on the activation of an additional carrier associated with the communication link 205-*b*. In some examples, the sidelink power headroom report trigger may be based on a prohibit timer (e.g., based on an expiration of the prohibit timer, based on the prohibit timer not running, etc.) and a power backoff change being greater than a threshold since the last transmission of a sidelink power headroom report.

The wireless communication system 200 may, in some examples, support power sharing across multiple communications links 205. For example, a transmit power of the UE 115-*a* may be dynamically shared. The transmit power of UE 115-*a* may be dynamically across the communication link 205-*a* and the communication link 205-*b*. In some cases, UE 115-*a* may reduce the transmit power of the communication link 205-*a* to reserve transmit power for the communication link 205-*b*. Dynamically sharing transmit power across multiple communication links, cells, or base stations may support simultaneous uplink and downlink communication. In some examples, the sidelink power headroom report trigger may be based on establishing of a new relay device (e.g., a new UE 115) or an activation of a new sidelink carrier associated with any relay device that is associated with the UE 115-*a*. In some cases, the transmit power of the UE 115-*a* may not be dynamically shared, and the sidelink power headroom report trigger may be based on establishing of a new relay device.

The UE 115-*a* may determine a power headroom value for the communication link 205-*a* and a power headroom value for the communication link 205-*b*. In some cases, the power headroom value for a sidelink (e.g., the communication link 205-*b*) may be determined in the same manner in which the power headroom value for a direct link (e.g., the communication link 205-*a*) is determined. When a sidelink associated with the UE 115-*a* is configured in a carrier aggregation mode, the UE 115-*a* may determine whether to report a real power headroom value or a virtual power headroom value for a carrier of the sidelink as it determines a physical sidelink shared channel (PSSCH) resource in which a power headroom report MAC control element (CE) will be transmitted. For example, in a first slot (e.g., slot "N"), the UE 115-*a* may determine that a later slot (e.g., slot "N+K") corresponds to the first available PSSCH for transmitting the power headroom report MAC-CE. During the first slot, the UE 115-*a* may determine whether to report a real power headroom value or a virtual power headroom value for a carrier (e.g., carrier "C"). A real power headroom value may be calculated based on one or more uplink messages (e.g., PUSCHs) transmitted on a channel, and a virtual headroom value may be calculated based on a reference formula for a channel. In some cases, real power headroom corresponds to an actual power for a channel and virtual power headroom correspond to an estimated power for a channel. The UE 115-*a* may determine whether to report a real power headroom value or a virtual power headroom value based on available scheduling information and whether there will be a PSSCH transmission on the carrier in the later slot. When a sidelink associated with the UE 115-*a* is not configured in a carrier aggregation mode, the UE 115-*a* may report real power headroom values for carriers of the sidelink.

The power headroom values reported for a sidelink may indicate an amount of available transmission power for the UE 115-*a*, considering the power used by current transmissions. Each cell group may be associated with a periodic power headroom report timer and a power headroom report prohibit timer. A communication link 205 may be associated with a cell group, and the timers associated with a cell group may be reset after the transmission of a power headroom report MAC-CE in the cell group. The timers of a cell group may not be affected by the transmission of a power headroom report MAC-CE in a different cell group.

The wireless communication system 200 may, as a result, include features for improvements to sidelink operations and, in some examples, may promote high reliability and low latency sidelink communications, among other benefits.

Figure 3A:
FIGS. 3A and 3B illustrate examples of sidelink power headroom report messages that support power headroom report for sidelinks in dual connectivity configuration in accordance with aspects of the present disclosure.
Figure 3B:

FIGS. 3A and 3B illustrate examples of sidelink power headroom report message 301 and 302 that support power headroom report for sidelinks in dual connectivity configuration in accordance with aspects of the present disclosure. In some examples, a sidelink power headroom report message 301 and a sidelink power headroom report message 302 may implement aspects of the wireless communications system 100 or the wireless communications system 200. The operations associated with the sidelink power headroom report message 301 or the sidelink power headroom report message 302 may be implemented by a UE 115 or its components as described herein.

A UE 115 may transmit the sidelink power headroom report message based on a sidelink power headroom report trigger. For example, if the UE 115 is configured without dynamic power sharing or multiple relays that are associated with the same base station, and the UE 115 determines that a sidelink power headroom report trigger condition has been satisfied, the UE 115 may transmit one or more sidelink power headroom report messages. The sidelink power headroom report message 301 may be transmitted on a sidelink with a single carrier (e.g., without CA configured) and the sidelink power headroom report message 302 may be transmitted on a sidelink with multiple carriers (e.g., with CA configured).

The UE 115 may transmit the sidelink power headroom report message 301 on a sidelink that includes a single carrier. The sidelink power headroom report message 301 may include a number of reserved bit fields 305, a power headroom value field 310, and a max transmission power field 315. The first eight bits of the sidelink power headroom report message 301 may include reserved bit 305-a, reserved bit 305-b, and power headroom value 310-a. The power headroom value 310-a may indicate a power headroom value corresponding to the link (e.g., the cell group, the MAC entity) that the sidelink power headroom report message 301 is transmitted on. In some cases, the sidelink power headroom report message 301 may be transmitted in a sidelink power headroom report MAC-CE.

The UE 115 may transmit the sidelink power headroom report message 302 on a sidelink that includes multiple carriers. The sidelink power headroom report message 302 may include a number of reserved bit fields 305, a number of power headroom value fields 310, a number of max transmission power fields 315, a number of carrier bit fields 320, a number of flag fields 325, and a number of flag fields 330. The first eight bits of the sidelink power headroom report message 302 may include reserved bit 305-e and a bitmap that includes the carrier bit fields 310. The bitmap of the sidelink power headroom report message 302 includes seven carrier fields 310 (e.g., carrier bit 320-a, 320-b, 320-c, 320-d, 320-e, 320-f, and 320-g), but it should be understood that the number of carrier fields may change to match the number of carriers associated with the link (e.g., the cell group, the MAC entity) the sidelink power headroom report message 302 is transmitted on. Each carrier field 320 may indicate whether power headroom information for a corresponding carrier is included in the sidelink power headroom report message 302, and the length of the bitmap may correspond to the number of carriers associated with the link. In some cases, a number of reserve bit fields 305 may be used to ensure the bitmap is byte aligned.

The flag fields 325 may indicate whether a max transmission power for a carrier is included in the sidelink power headroom report message 302. For example, flag field 325-a may indicate whether a maximum transmission power for a first carrier (e.g., carrier 320-a) is included in the sidelink power headroom report message 302. In some cases, a flag field 325 may be set if the corresponding power headroom value (e.g., the corresponding power headroom value field 310) is real. The flag fields 330 may indicate whether a power headroom value for a carrier is virtual. For example, flag field 330-a may indicate whether a power headroom value for a first carrier (e.g., carrier 320-a) is virtual. In some cases, if a flag field 330 (e.g., flag field 330-a) indicates that a power headroom value field (e.g., power headroom value field 310-b) is virtual, a corresponding max transmission power field (e.g., max transmission power field 315-b) may not be included in the sidelink power headroom report message 302. In some cases, sidelink power headroom report message 301 may be transmitted as a sidelink power headroom report MAC-CE.

FIG. 4 illustrates an example of a sidelink power headroom report message 400 that supports power headroom report for sidelinks in dual connectivity configuration in accordance with aspects of the present disclosure. In some examples, a sidelink power headroom report message 400 may implement aspects of the wireless communications system 100 or the wireless communications system 200. The operations associated with a sidelink power headroom report message 400 may be implemented by a UE 115 or its components as described herein.

A UE 115 may transmit a sidelink power headroom report message based on a sidelink power headroom report trigger. For example, if the UE 115 is configured with dynamic power sharing and multiple relays that are associated with the different base stations, and the UE 115 determines that a sidelink power headroom report trigger condition has been satisfied, the UE 115 may transmit one or more sidelink power headroom report messages. Sidelink power headroom report message 400 may be transmitted on a sidelink with a single carrier (e.g., without CA configured) or on a sidelink with multiple carriers (e.g., with CA configured). In some cases, the UE 115 may transmit a sidelink power headroom report message 400 on each sidelink the UE 115 is associated with, and each sidelink power headroom report message 400 may include power headroom information corresponding to carriers associated with the sidelink the power headroom report message 400 is transmitted on. In such cases, the different base stations that the UE 115 is associated with may communicate (e.g., via a backhaul link) to allocate resources for the UE 115 (e.g., the base stations may coordinate carrier indices for the UE 115, transmissions power for the UE 115, transmissions modes for the UE, etc.).

In some cases, the UE 115 may transmit a sidelink power headroom report message 400 that includes power headroom information for each link (e.g., cell group, MAC entity) that the UE 115 is associated with. The UE 115 may transmit sidelink power headroom report message 400 on one or more sidelinks. Some of the sidelinks may include multiple carriers, while some of the sidelinks may include a single carrier. The sidelink power headroom report message 400 may include a number of reserved bit fields 405, a number of cell ID fields 410, a number of power headroom value fields 415, a number of max transmission power fields 420, a number of carrier bit fields 425, a number of flag fields 430, and a number of flag fields 435. The first eight bits of the sidelink power headroom report message 400 may include reserved bits 405-*a*, 405-*b*, and cell ID field 410-*a* that indicates a cell of a base station that the UE 115 is associated with. The number of cell ID fields 410 included in the sidelink power headroom report message 400 may correspond to the number of cell groups the UE 115 is associated with. The sidelink power headroom report message 400 may include power headroom information for each cell group associated with the UE 115.

The sidelink power headroom report message 400 may include a number of bitmaps that each correspond to a cell group. A bitmap may include a number of carrier bit fields 425. For example, the bitmap corresponding to the cell group identified in cell ID field 410-*a* may include seven carrier bit fields 425 (e.g., a carrier bit field 425-*a*, a carrier bit field 425-*b*, a carrier bit field 425-*c*, a carrier bit field 425-*d*, a carrier bit field 425-*e*, a carrier bit field 425-*f*, and a carrier bit field 425-*g*), but it should be understood that the number of carrier fields can change to match the number of carriers associated with the corresponding cell group. Each carrier bit field 425 may indicate whether power headroom information for a corresponding carrier is included in the sidelink power headroom report message 400. In some cases, a number of reserve bit fields 405 may be used to ensure the bitmap is byte aligned.

Each cell group indicated in the sidelink power headroom report message 400 may include a number of power headroom value fields 415 that corresponds to the number of carriers in the respective cell group, a number of maximum transmission power fields 420 that corresponds to the number of carriers in the respective cell group, a number of flag fields 430 that corresponds to the number of carriers in the respective cell group, and a number of flag fields 435 that corresponds to the number of carriers in the respective cell group.

The flag fields 430 may indicate whether a max transmission power for a carrier is included in the sidelink power headroom report message 400. For example, flag field 430-*b* may indicate whether a maximum transmission power for a carrier (e.g., carrier 410-*a*) of a cell group (e.g., the cell group indicated in cell ID field 410-*b*) is included in the sidelink power headroom report message 400. In some cases, a flag field 430 may be set if the corresponding power headroom value (e.g., the corresponding power headroom value field 415) is real. The flag fields 435 may indicate whether a power headroom value for a carrier is virtual. For example, flag field 435-*b* may indicate whether a power headroom value for a carrier (e.g., carrier 410-*h*) is virtual. In some cases, if a flag field 435 (e.g., flag field 435-*b*) indicates that a power headroom value field is virtual (e.g., power headroom value field 415-*b*), a corresponding max transmission power field (e.g., a max transmission power field 420-*b*) may not be included in the sidelink power headroom report message 400. In some cases, sidelink power headroom report message 400 may be transmitted as a sidelink power headroom report MAC-CE.

The UE 115 may be configured without dynamic power sharing. In such cases, the UE 115 may transmit the sidelink power headroom report message 400 through the relay that triggers the transmission of the sidelink power headroom report message 400. The sidelink power headroom report message 400 may include power headroom information for the carriers that correspond to the MAC entity in which the power headroom report was triggered. In some additional or alternative cases, the UE 115 may be configured with dynamic power sharing. The sidelink power headroom report message 400 may include power headroom information for all sidelink carriers that are associated with the UE. The UE 115 may determine to include a real or a virtual power headroom value (e.g., a power headroom value field 415) for a carrier based on the UE 115 determining when a resource (e.g., a first PSSCH resource) becomes available. Any additional available uplink resources after this resource and before the assembling of a MAC protocol data unit (PDU) including a power headroom report MAC-CE (e.g., a sidelink power headroom report message 400) may not change the type of power headroom value (e.g., a real type, a virtual type) reported to the relay.

In some examples, the UE 115 may be associated with (e.g., in communication with) multiple relays that are associated with different base stations. In such examples, the UE 115 may send a sidelink power headroom report message 400 through each relay the UE 115 is associated with. For example, if a first relay triggers the reporting of power headroom information, the UE 115 may transmit a sidelink power headroom report message 400 to a first relay and a second relay. A power headroom report timer (e.g., a prohibit timer) associated with each relay may be started or restarted based on transmitting a sidelink power headroom report message to the corresponding relay.

In some other examples, the UE 115 may be associated with multiple relays that are associated with the base station. In such examples, the UE 115 may transmit a single sidelink power headroom report message 400 to a relay. The sidelink power headroom report message 400 may be transmitted to the relay that provides the first available resource (e.g., the first available PSSCH). In some cases, a base station may configure the UE 115 with a policy (e.g., a logical channel prioritization (LCP) restriction policy) that restricts messages (e.g., MAC-CEs) from being transmitted through an indicated relay. In such cases, the UE 115 may refrain from transmitting the sidelink power headroom report message 400 through the indicated relay. Transmission of the sidelink power headroom report message 400 may be triggered for each relay, but once a sidelink power headroom report message is transmitted to a relay, the transmission of sidelink power headroom report messages to other relays may be canceled. Transmitting a sidelink power headroom report message that includes power headroom information for multiple cell groups may support a base station in efficiently allocating resources to the UE, which may reduce latency and improve system performance.

Figure 5:
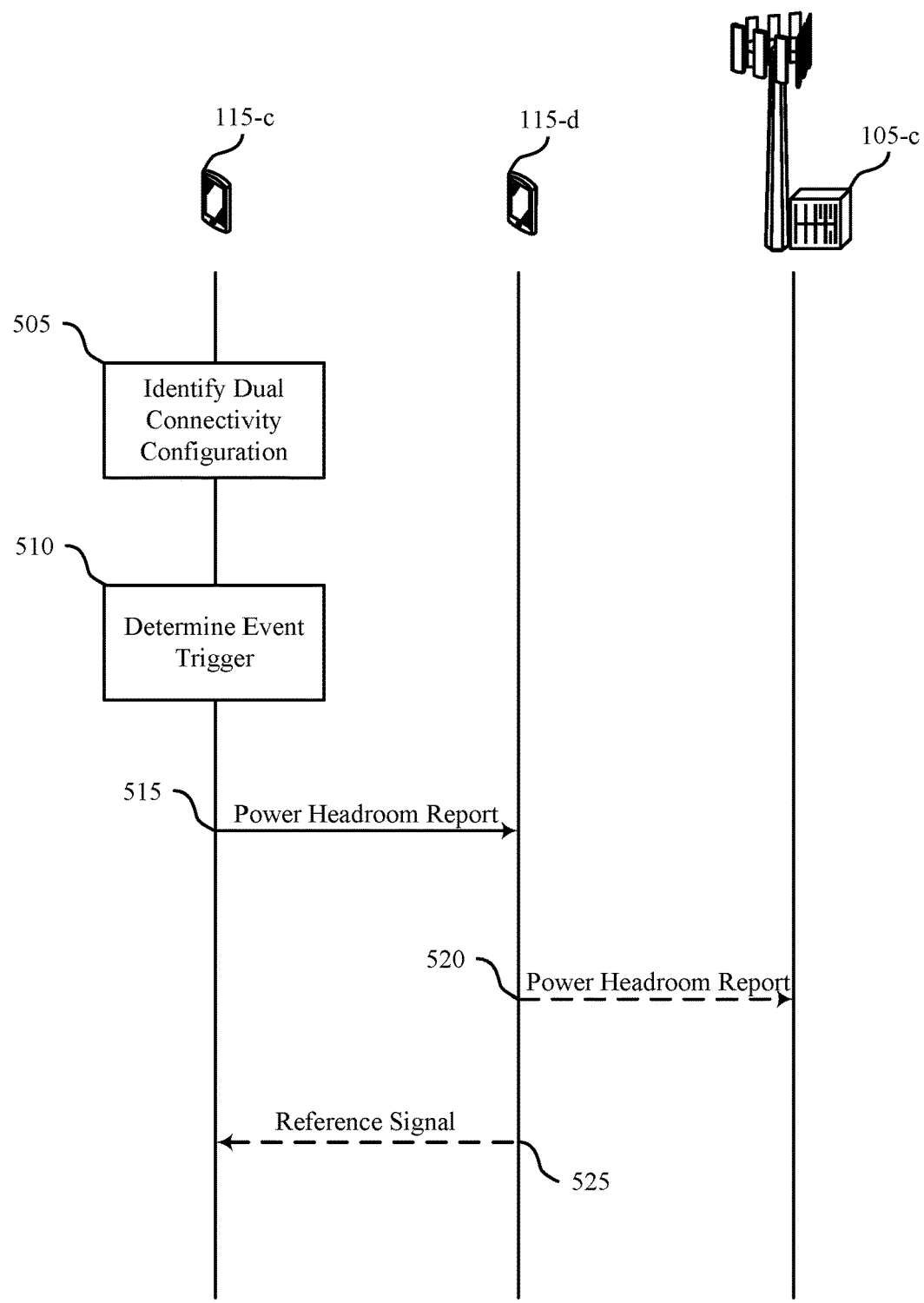
FIG. 5 illustrates an example of a process flow that supports power headroom report for sidelinks in dual connectivity configuration in accordance with aspects of the present disclosure.

FIG. 5 illustrates an example of a process flow 500 in accordance with aspects of the present disclosure. The process flow 500 may implement aspects of the wireless communications system 100 and the wireless communications system 200 described with reference to FIGS. 1 and 2, respectively. The process flow 500 may be based on a configuration by a base station 105-*c* and implemented by a UE 115-*c*, 115-*d* to promote power saving for the UE 115-*c*, 115-*d* by providing a power headroom reports across multiple sidelinks to improve network efficiency and decrease latency. The process flow 500 may also be based on a configuration by the base station 105-*c* and implemented by the UE 115-*c*, 115-*d* to promote high reliability and low latency sidelink communications, among other benefits.

In the following description of the process flow 500, the operations between the base station 105-*c* and the UE 115-*c*, 115-*d* may be transmitted in a different order than the example order shown, or the operations performed by the base station 105-*c* and the UE 115-*c*, 115-*d* may be performed in different orders or at different times. Some operations may also be omitted from the process flow 500, and other operations may be added to the process flow 500. The base station 105-*c* and the UE 115-*c*, 115-*d* may be examples of a base station 105 and a UE 115 as described with reference to FIGS. 1 and 2, respectively.

At 505, the UE 115-*c* may identify a dual connectivity configuration for a set of communication links. In some cases, at least one communication link of the set of communication links may include a sidelink. At 510, the UE 115-*a* may determine an event trigger (e.g., a power headroom report trigger) associated with the sidelink. In some cases, the event trigger may trigger a power headroom report. The event trigger may, in some other cases, be based on identifying an activation of at least one additional sidelink carrier, establishing an additional sidelink, or determining a minimum path loss value.

At 515, the UE 115-*c* may transmit a power headroom report based on the determined event trigger associated with the sidelink. At 520, a relay device, such as the UE 115-*d*, may forward or transmit the power headroom report to the base station 105-*c*. In some cases, the UE 115-*c* may receive one or more reference signals at 525. The UE 115-*c* may measure a set of path loss values based on the one or more reference signals and determine a minimum path loss value of the measured path loss values. In some cases, the event trigger may be based on the determined minimum path loss value.

Figure 6:
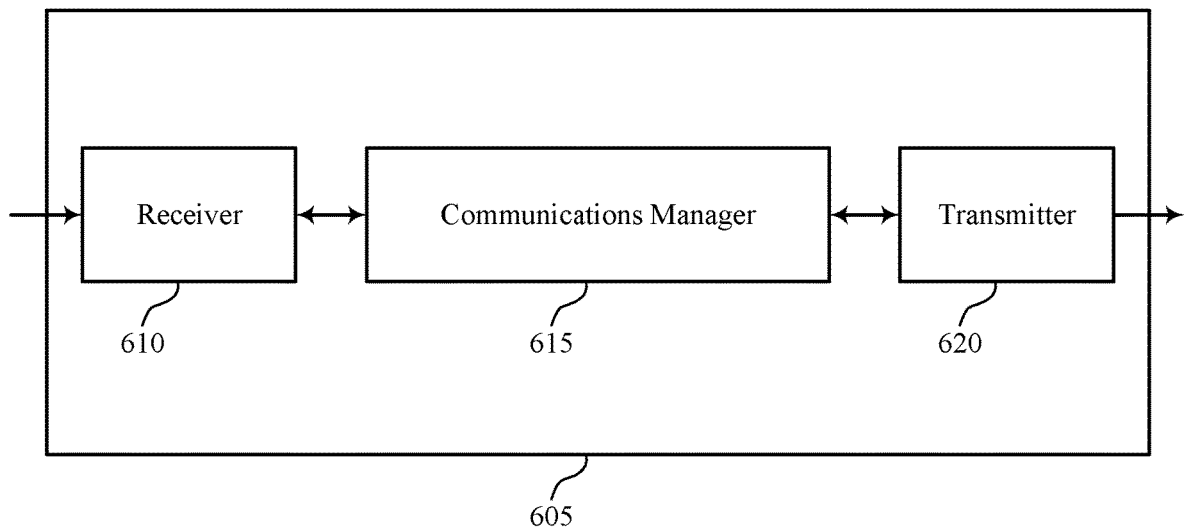
FIGS. 6 and 7 show block diagrams of devices that support power headroom report for sidelinks in dual connectivity configuration in accordance with aspects of the present disclosure.

FIG. 6 shows a block diagram 600 of a device 605 that supports power headroom report for sidelinks in dual connectivity configuration in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to power headroom report for sidelinks in dual connectivity configuration, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a dual connectivity configuration for a set of communication links, where at least one communication link of the set of communication links includes a sidelink. The communications manager 615 may transmit a report based on an event associated with the sidelink that triggers the report, the report including power headroom information for the sidelink. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
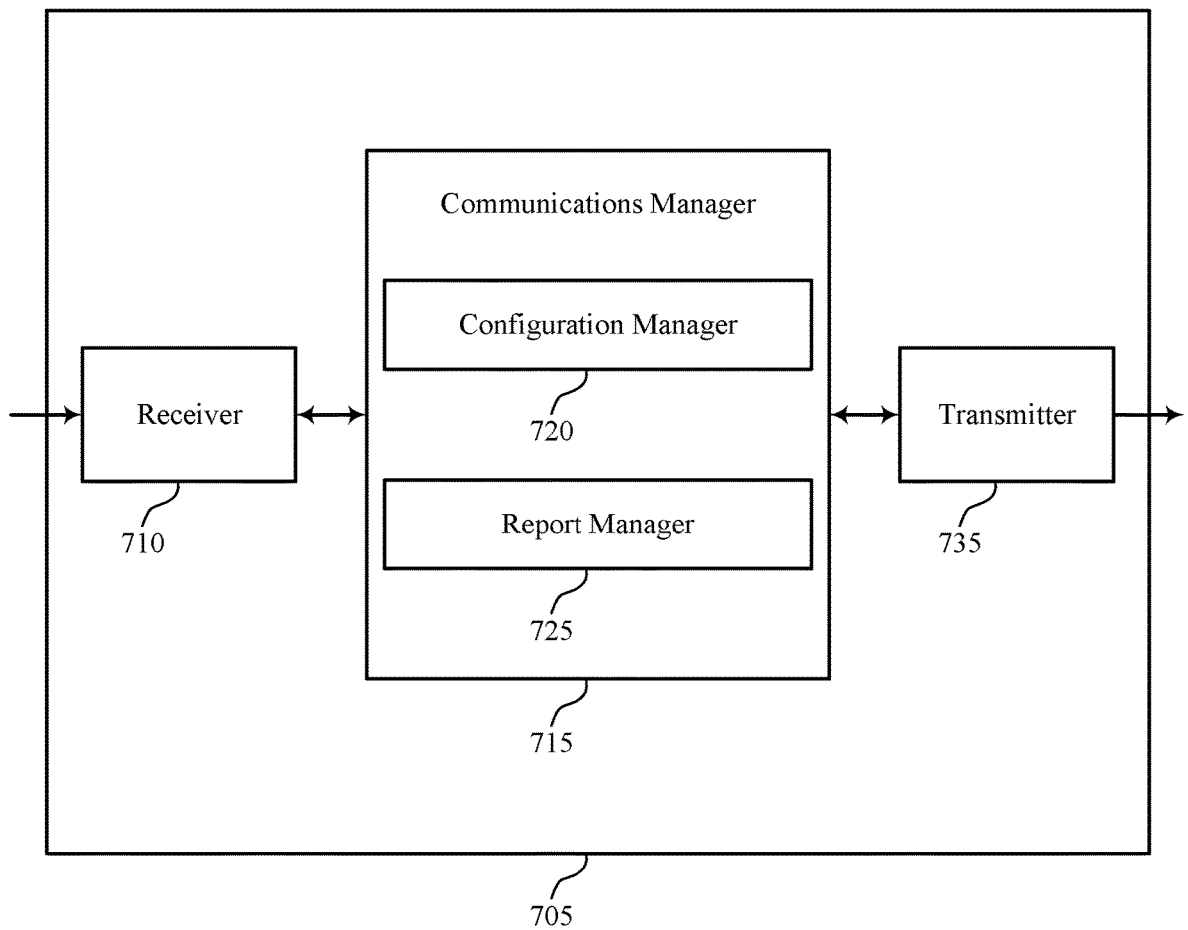

FIG. 7 shows a block diagram 700 of a device 705 that supports power headroom report for sidelinks in dual connectivity configuration in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to power headroom report for sidelinks in dual connectivity configuration, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration manager 720 and a report manager 725. The communications manager 715 may be an example of aspects of the communications manager 910 described herein. The configuration manager 720 may identify a dual connectivity configuration for a set of communication links, where at least one communication link of the set of communication links includes a sidelink. The report manager 725 may transmit a report based on an event associated with the sidelink that triggers the report, the report including power headroom information for the sidelink.

The transmitter 735 may transmit signals generated by other components of the device 705. In some examples, the transmitter 735 may be collocated with a receiver 710 in a transceiver component. For example, the transmitter 735 may be an example of aspects of the transceiver 920 described with reference to FIG. 9. The transmitter 735 may utilize a single antenna or a set of antennas.

Figure 8:
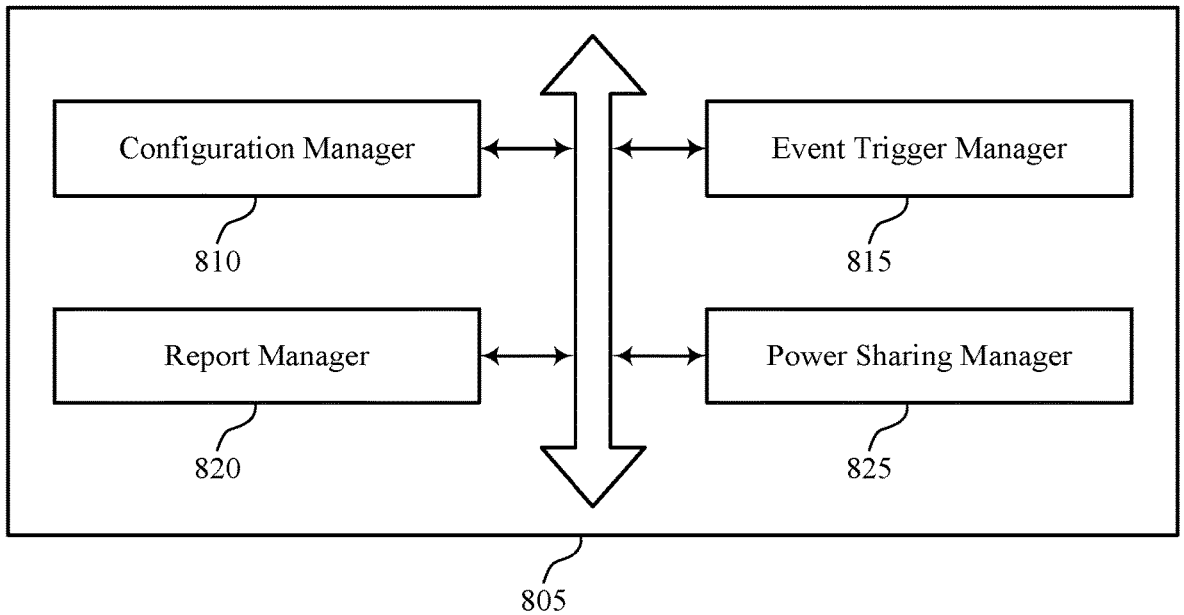
FIG. 8 shows a block diagram of a communications manager that supports power headroom report for sidelinks in dual connectivity configuration in accordance with aspects of the present disclosure.

FIG. 8 shows a block diagram 800 of a communications manager 805 that supports power headroom report for sidelinks in dual connectivity configuration in accordance with aspects of the present disclosure. The communications manager 805 may be an example of aspects of a communications manager 615, a communications manager 715, or a communications manager 910 described herein. The communications manager 805 may include a configuration manager 810, an event trigger manager 815, a report manager 820, and a power sharing manager 825. Each of these components may communicate, directly or indirectly, with one another (e.g., via one or more buses).

The configuration manager 810 may identify a dual connectivity configuration for a set of communication links, where at least one communication link of the set of communication links includes a sidelink. The event trigger manager 815 may determine an event associated with the sidelink that triggers a report. In some examples, the event trigger manager 815 may identify an activation of at least one additional sidelink carrier associated with a communication link of the set of communication links. In some examples, the event trigger manager 815 may determine the event associated with the sidelink that triggers the report based on the activation of the at least one additional sidelink carrier. In some other examples, the report manager 820 may transmit the report based on the activation of the at least one additional sidelink carrier. In some examples, the event trigger manager 815 may establish a relay communication link between the UE and a relay network node. In some examples, the event trigger manager 815 may determine the event associated with the sidelink that triggers the report based on establishing the relay communication link. In some other examples, the report manager 820 may transmit the report based on establishing the relay communication link.

The event trigger manager 815 may receive a set of reference signals over one or more sidelink carriers associated with the sidelink. In some examples, the event trigger manager 815 may measure a set of path loss values based on the received set of reference signals over the one or more sidelink carriers associated with the sidelink. In some examples, the event trigger manager 815 may determine the event associated with the sidelink that triggers the report based on the measured set of path loss values. In some other examples, the report manager 820 may transmit the report based on the measured set of path loss values.

In some examples, the event trigger manager 815 may determine a minimum path loss value of the measured set of path loss values. In some examples, the event trigger manager 815 may determine the event associated with the sidelink that triggers the power based on the minimum path loss value. In some examples, the event trigger manager 815 may determine a power backoff value for one or more sidelink carriers associated with the sidelink. In some examples, the event trigger manager 815 may determine the event associated with the sidelink that triggers the report based on the power backoff value for the one or more sidelink carriers associated with the sidelink. In some other examples, the report manager 820 may transmit the report based on the power backoff value for the one or more sidelink carriers associated with the sidelink.

The report manager 820 may transmit the report based on the event associated with the sidelink that triggers the report. In some examples, the report manager 820 may determine an available resource to transmit the report based on the sidelink. In some examples, the report manager 820 may determine to include in the report real power headroom information or virtual power headroom information for a sidelink carrier based on the available resource. In some examples, the report manager 820 may transmit a power headroom report MAC-CE via the sidelink based on an event associated with the sidelink that triggers the report, the report including the power headroom report MAC-CE.

The report manager 820 may transmit the power headroom report MAC-CE irrespective of the sidelink of the set of communication links and an access link of the set of communication links terminating at a same base station. In some examples, the report manager 820 may transmit a first power headroom report MAC-CE via a first communication link of the set of communication links based on that the UE is configured for dynamic power sharing between at least two communication links. In some examples, the report manager 820 may transmit a second power headroom report MAC-CE via a second communication link of the set of communication links based on that the UE is configured for dynamic power sharing between that at least two communication links. In some examples, the report manager 820 may transmit the power headroom report MAC-CE separately on each communication link of the at least two communication links.

The report manager 820 may transmit a single power headroom report MAC-CE via at least one communication link of the set of communications links, the at least one communication link including the sidelink or an access link based on an available resource of the at least one communication link. In some examples, the report manager 820 may transmit a power headroom report MAC-CE via the at least one communication link of the set of communications links based on an LCP restriction policy. In some examples, the report manager 820 may terminate a reporting on at least one other communication link of the set of communication links that is triggered to transmit the report based on transmitting the report on the at least one communication link of the set of communications links. In some cases, the report includes a power headroom report MAC-CE including power headroom information of all carriers associated with the sidelink. In some cases, the report includes a power headroom report MAC-CE including power headroom information exclusively of sidelink carriers in which the report is triggered.

The power headroom report MAC-CE includes a bitmap identifying each sidelink carrier associated with the sidelink. In some cases, a size of the bitmap is equal to a total number of sidelink carriers configured for the sidelink. In some cases, the bitmap includes carrier identifiers associated with a respective communication link of the set of communication links or cell identifiers of a respective base station, or both. In some cases, the first power headroom report MAC-CE includes first power headroom information and the second power headroom report MAC-CE includes second power headroom information, and the first power headroom information is the same as the second power headroom information or the first power headroom information is different than the second power headroom information.

The power sharing manager 825 may determine dynamic power sharing between a first subset of the set of communication links that terminate at a first network node and a second subset of the set of communication links that terminate at a second network node. In some cases, the UE is configured for dynamic power sharing between a first subset of the set of communication links that terminate at a first network node and a second subset of the set of communication links that terminate at a second network node.

Figure 9:
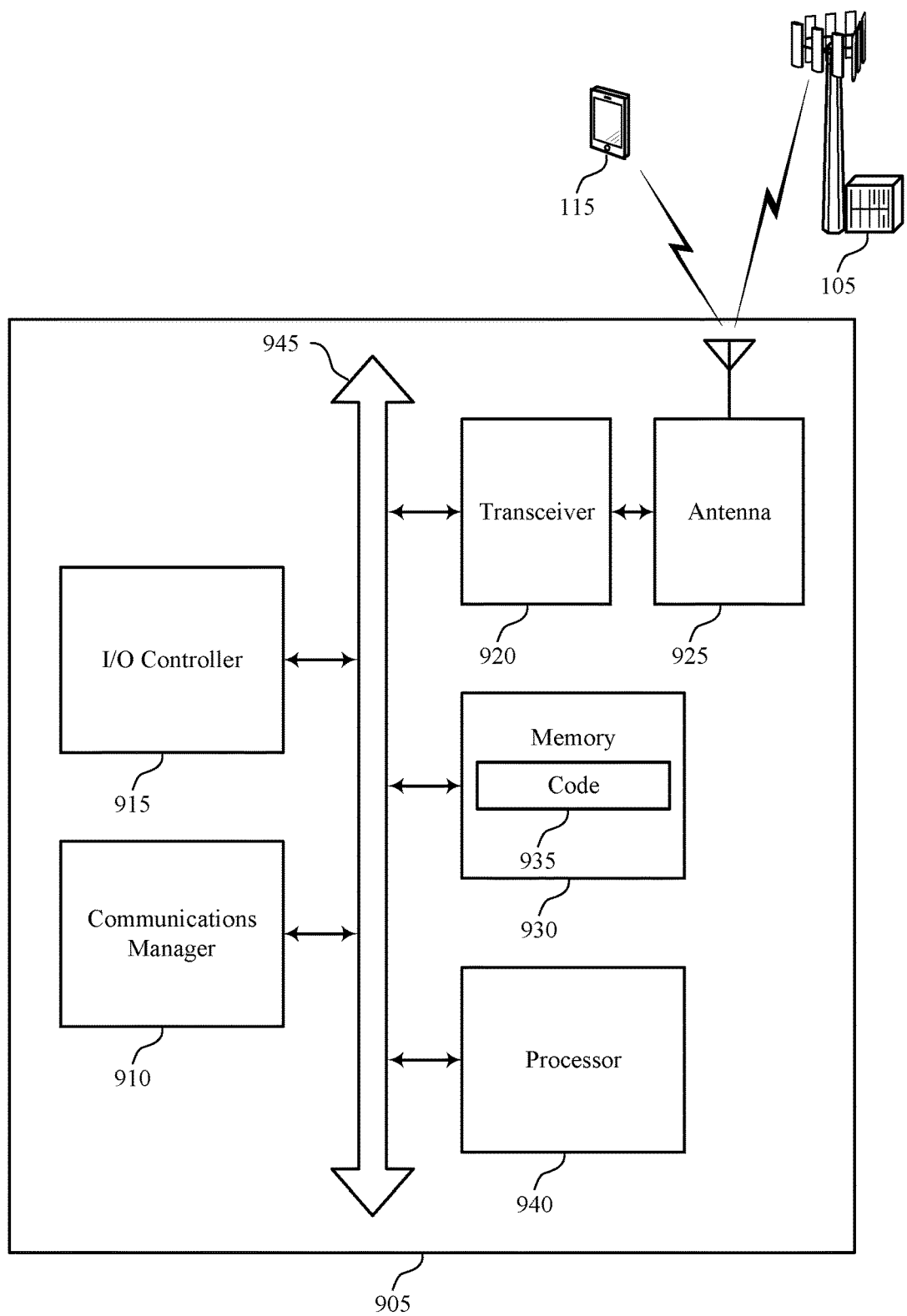
FIG. 9 shows a diagram of a system including a device that supports power headroom report for sidelinks in dual connectivity configuration in accordance with aspects of the present disclosure.

FIG. 9 shows a diagram of a system 900 including a device 905 that supports power headroom report for sidelinks in dual connectivity configuration in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a dual connectivity configuration for a set of communication links, where at least one communication link of the set of communication links includes a sidelink, and transmit a report based on an event associated with the sidelink that triggers the report, the report including power headroom information for the sidelink.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor 940 to perform various functions described herein. In some cases, the memory 930 may include, among other things, a BIOS which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting power headroom report for sidelinks in dual connectivity configuration).

Figure 10:
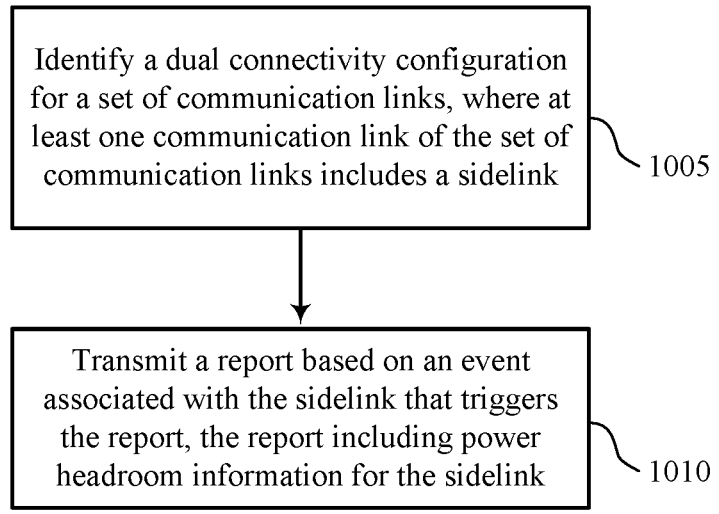
FIGS. 10 through 12 show flowcharts illustrating methods that support power headroom report for sidelinks in dual connectivity configuration in accordance with aspects of the present disclosure.

FIG. 10 shows a flowchart illustrating a method 1000 that supports power headroom report for sidelinks in dual connectivity configuration in accordance with aspects of the present disclosure. The operations of method 1000 may be implemented by a UE or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may identify a dual connectivity configuration for a set of communication links, where at least one communication link of the set of communication links includes a sidelink. The operations of 1005 may be performed according to the methods described herein. In some examples, aspects of the operations of 1005 may be performed by a configuration manager as described with reference to FIGS. 6 through 9.

At 1010, the UE may transmit a report based on an event associated with the sidelink that triggers the report, the report including power headroom information for the sidelink. The operations of 1010 may be performed according to the methods described herein. In some examples, aspects of the operations of 1010 may be performed by a report manager as described with reference to FIGS. 6 through 9.

Figure 11:
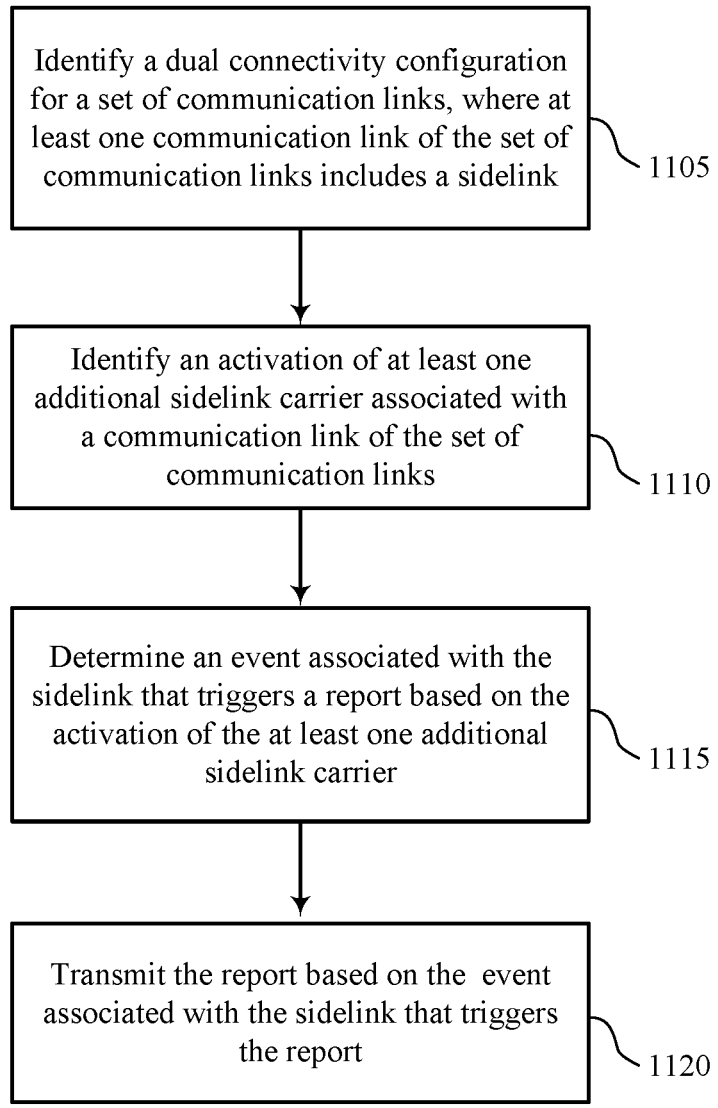

FIG. 11 shows a flowchart illustrating a method 1100 that supports power headroom report for sidelinks in dual connectivity configuration in accordance with aspects of the present disclosure. The operations of method 1100 may be implemented by a UE or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may identify a dual connectivity configuration for a set of communication links, where at least one communication link of the set of communication links includes a sidelink. The operations of 1105 may be performed according to the methods described herein. In some examples, aspects of the operations of 1105 may be performed by a configuration manager as described with reference to FIGS. 6 through 9.

At 1110, the UE may identify an activation of at least one additional sidelink carrier associated with a communication link of the set of communication links. The operations of 1110 may be performed according to the methods described herein. In some examples, aspects of the operations of 1110 may be performed by an event trigger manager as described with reference to FIGS. 6 through 9.

At 1115, the UE may determine an event associated with the sidelink that triggers a report based on the activation of the at least one additional sidelink carrier. The operations of 1115 may be performed according to the methods described herein. In some examples, aspects of the operations of 1115 may be performed by an event trigger manager as described with reference to FIGS. 6 through 9.

At 1120, the UE may transmit the report based on the event associated with the sidelink that triggers the report. The operations of 1120 may be performed according to the methods described herein. In some examples, aspects of the operations of 1120 may be performed by a report manager as described with reference to FIGS. 6 through 9.

Figure 12:
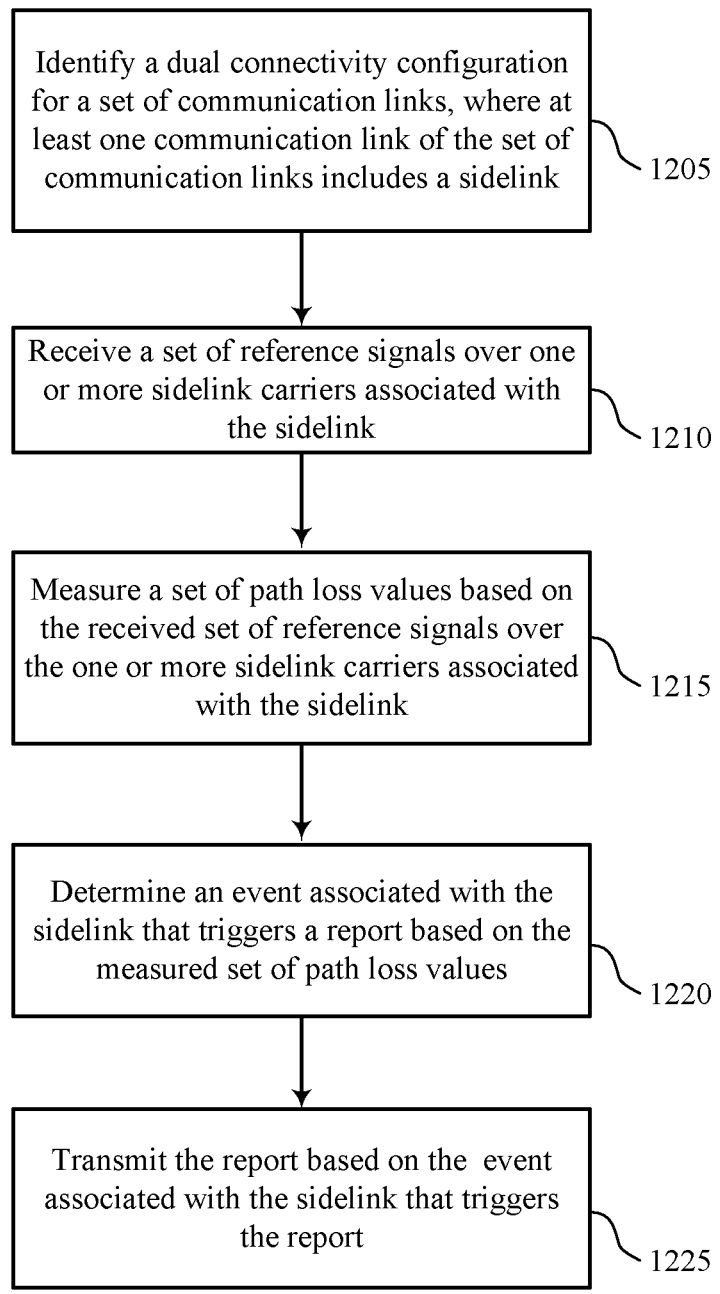

FIG. 12 shows a flowchart illustrating a method 1200 that supports power headroom report for sidelinks in dual connectivity configuration in accordance with aspects of the present disclosure. The operations of method 1200 may be implemented by a UE or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may identify a dual connectivity configuration for a set of communication links, where at least one communication link of the set of communication links includes a sidelink. The operations of 1205 may be performed according to the methods described herein. In some examples, aspects of the operations of 1205 may be performed by a configuration manager as described with reference to FIGS. 6 through 9.

At 1210, the UE may receive a set of reference signals over one or more sidelink carriers associated with the sidelink. The operations of 1210 may be performed according to the methods described herein. In some examples, aspects of the operations of 1210 may be performed by an event trigger manager as described with reference to FIGS. 6 through 9.

At 1215, the UE may measure a set of path loss values based on the received set of reference signals over the one or more sidelink carriers associated with the sidelink. The operations of 1215 may be performed according to the methods described herein. In some examples, aspects of the operations of 1215 may be performed by an event trigger manager as described with reference to FIGS. 6 through 9.

At 1220, the UE may determine an event associated with the sidelink that triggers a report based on the measured set of path loss values. The operations of 1220 may be performed according to the methods described herein. In some examples, aspects of the operations of 1220 may be performed by an event trigger manager as described with reference to FIGS. 6 through 9.

At 1225, the UE may transmit the report based on the event associated with the sidelink that triggers the report. The operations of 1225 may be performed according to the methods described herein. In some examples, aspects of the operations of 1225 may be performed by a report manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The following examples are given by way of illustration. Aspects of the following examples may be combined with aspects or embodiments shown or discussed in relation to the figures or elsewhere herein.

Example 1 is a method for wireless communication at a UE that includes identifying a dual connectivity configuration for a plurality of communication links, wherein at least one communication link of the plurality of communication links comprises a sidelink; and transmitting a report based at least in part on an event associated with the sidelink that triggers the report, the report including power headroom information for the sidelink.

Example 2, the method of example 1, further includes identifying an activation of at least one additional sidelink carrier associated with a communication link of the plurality of communication links, wherein transmitting the report is based at least in part on the activation of the at least one additional sidelink carrier.

Example 3, the method of examples 1 or 2, further includes establishing a relay communication link between the UE and a relay network node, wherein transmitting the report is based at least in part on establishing the relay communication link.

Example 4, the method of any of examples 1-3, further includes receiving a set of reference signals over one or more sidelink carriers associated with the sidelink; and measuring a set of path loss values based at least in part on the received set of reference signals over the one or more sidelink carriers associated with the sidelink, wherein transmitting the report is based at least in part on the measured set of path loss values.

Example 5, the method of example 4, further includes determining a minimum path loss value of the measured set of path loss values, wherein transmitting the report is based at least in part on the minimum path loss value.

Example 6, the method of any of examples 1-5, further includes determining a power backoff value for one or more sidelink carriers associated with the sidelink, wherein transmitting the report is based at least in part on the power backoff value for the one or more sidelink carriers associated with the sidelink.

Example 7, the method of any of examples 1-6, further includes determining an available resource to transmit the report based at least in part on the sidelink, wherein transmitting the report comprises transmitting a power headroom report MAC-CE on a PSSCH based at least in part on the available resource.

Example 8, the method of example 7, further includes determining to include in the report real power headroom information or virtual power headroom information for a sidelink carrier based at least in part on the available resource.

Example 9, the method of example 7, wherein the power headroom report comprises a power headroom report MAC-CE including power headroom information of all carriers associated with the sidelink.

Example 10, the method of example 7, wherein the report comprises a power headroom report MAC-CE including power headroom information exclusively of sidelink carriers in which the report is triggered.

Example 11, the method of any of examples 1-10, wherein the power headroom report MAC-CE comprises a bitmap identifying each sidelink carrier associated with the sidelink.

Example 12, the method of example 11, wherein a size of the bitmap is equal to a total number of sidelink carriers configured for the sidelink.

Example 13, the method of example 11, wherein the bitmap comprise carrier identifiers associated with a respective communication link of the plurality of communication links or cell identifiers of a respective base station, or both.

Example 14, the method of any of examples 1-13, further includes transmitting a power headroom report MAC-CE via the sidelink based at least in part on the event associated with the sidelink that triggers the report, the report comprising the power headroom report MAC-CE.

Example 15, the method of example 14, wherein transmitting the power headroom report MAC-CE is irrespective of the sidelink of the plurality of communication links and an access link of the plurality of communication links terminating at a same base station.

Example 16, the method of any of examples 1-15, further includes transmitting a first power headroom report MAC-CE via a first communication link of the plurality of communication links based at least in part on that the UE is configured for dynamic power sharing between at least two communication links, and transmitting a second power headroom report MAC-CE via a second communication link of the plurality of communication links based at least in part on that the UE is configured for dynamic power sharing between that at least two communication links.

Example 17, the method of example 16, wherein the first power headroom report MAC-CE includes first power headroom information and the second power headroom report MAC-CE includes second power headroom information, and the first power headroom information is the same as the second power headroom information or the first power headroom information is different than the second power headroom information.

Example 18, the method of example 16, further includes transmitting the power headroom report MAC-CE separately on each communication link of the at least two communication links.

Example 19, the method of any of examples 1-18, further includes transmitting a single power headroom report MAC-CE via at least one communication link of the plurality of communications links, the at least one communication link comprising the sidelink or an access link based at least in part on an available resource of the at least one communication link.

Example 20, the method of example 19, further includes transmitting a power headroom report MAC-CE via the at least one communication link of the plurality of communications links based at least in part on an LCP restriction policy.

Example 21, the method of any of examples 1-20, further includes terminating a reporting on at least one other communication link of the plurality of communication links that is triggered to transmit the report based at least in part on transmitting the report on the at least one communication link of the plurality of communications links.

Example 22, the method of any of examples 1-21, wherein the UE is configured for dynamic power sharing between a first subset of the plurality of communication links that terminate at a first network node and a second subset of the plurality of communication links that terminate at a second network node.

Example 23 is an apparatus for wireless communication including a processor, memory coupled with the processor; and instructions stored in the memory and executable by the processor to cause the apparatus to implement a method as in any of examples 1-22.

Example 24 is an apparatus including means for implementing a method or realizing an apparatus as in any of examples 1-22.

Example 25 is a non-transitory computer-readable medium storing instructions executable by one or more processors to cause the one or more processors to implement a method as in any of examples 1-22.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a dual connectivity configuration for a plurality of communication links, wherein at least one communication link of the plurality of communication links comprises a sidelink;
   identifying an activation of at least one additional sidelink carrier associated with a communication link of the plurality of communication links; and
   transmitting a report based at least in part on identifying the activation of the at least one additional sidelink carrier, the report including power headroom information for the sidelink.

2. The method of claim 1, further comprising:
   establishing a relay communication link between the UE and a relay network node, wherein transmitting the report is based at least in part on establishing the relay communication link.

3. The method of claim 1, further comprising:
   receiving a set of reference signals over one or more sidelink carriers associated with the sidelink; and
   measuring a set of path loss values based at least in part on the set of reference signals over the one or more sidelink carriers associated with the sidelink, wherein transmitting the report is based at least in part on the set of path loss values.

4. The method of claim 3, further comprising:
   determining a minimum path loss value of the set of path loss values, wherein transmitting the report is based at least in part on the minimum path loss value.

5. The method of claim 1, further comprising:
   determining a power backoff value for one or more sidelink carriers associated with the sidelink, wherein transmitting the report is based at least in part on the power backoff value for the one or more sidelink carriers associated with the sidelink.

6. The method of claim 1, further comprising:
   determining an available resource to transmit the report based at least in part on the sidelink, wherein transmitting the report comprises:
   transmitting a power headroom report medium access control-control element on a physical sidelink shared channel based at least in part on the available resource.

7. The method of claim 6, wherein the report comprises real power headroom information or virtual power headroom information for a sidelink carrier based at least in part on the available resource.

8. The method of claim 6, wherein the report comprises the power headroom report medium access control-control element including power headroom information of all carriers associated with the sidelink.

9. The method of claim 6, wherein the report comprises the power headroom report medium access control-control element including power headroom information exclusively of sidelink carriers in which the report is triggered.

10. The method of claim 1, wherein transmitting the report comprises:
    transmitting a power headroom report medium access control-control element via the sidelink based at least in part on an event occurring via the sidelink that triggers the report, the report comprising the power headroom report medium access control-control element.

11. The method of claim 10, wherein transmitting the power headroom report medium access control-control element is irrespective of the sidelink of the plurality of communication links and an access link of the plurality of communication links terminating at a same base station.

12. The method of claim 1, further comprising:
    transmitting a first power headroom report medium access control-control element via a first communication link of the plurality of communication links based at least in part on that the UE is configured for dynamic power sharing between at least two communication links; and
    transmitting a second power headroom report medium access control-control element via a second communication link of the plurality of communication links based at least in part on that the UE is configured for dynamic power sharing between that at least two communication links.

13. The method of claim 12, wherein the first power headroom report medium access control-control element includes first power headroom information and the second power headroom report medium access control-control element includes second power headroom information, and the first power headroom information is equivalent to the second power headroom information or the first power headroom information is different than the second power headroom information.

14. The method of claim 12, wherein transmitting the first power headroom report medium access control-control element and the second power headroom report medium access control-control element comprises:
transmitting the first power headroom report medium access control-control element and the second power headroom report medium access control-control element separately on each communication link of the at least two communication links.

15. The method of claim 1, wherein transmitting the report comprises:
transmitting a single power headroom report medium access control-control element via at least one communication link of the plurality of communication links, the at least one communication link comprising the sidelink or an access link based at least in part on an available resource of the at least one communication link.

16. The method of claim 1, wherein transmitting the report comprises:
transmitting a power headroom report medium access control-control element via the at least one communication link of the plurality of communication links based at least in part on a logical channel prioritization restriction policy.

17. The method of claim 16, wherein the power headroom report medium access control-control element comprises a bitmap identifying each sidelink carrier associated with the sidelink.

18. The method of claim 17, wherein a size of the bitmap is equal to a total number of sidelink carriers configured for the sidelink.

19. The method of claim 17, wherein the bitmap comprise carrier identifiers associated with a respective communication link of the plurality of communication links or cell identifiers of a respective base station, or both.

20. The method of claim 1, further comprising:
terminating a reporting on at least one other communication link of the plurality of communication links that is triggered to transmit the report based at least in part on transmitting the report on the at least one communication link of the plurality of communication links.

21. The method of claim 1, wherein the UE is configured for dynamic power sharing between a first subset of the plurality of communication links that terminate at a first network node and a second subset of the plurality of communication links that terminate at a second network node.

22. A user equipment (UE) for wireless communication, comprising:
one or more processors,
one or more memories coupled with the one or more processors; and
one or more processor-readable instructions stored in the one or more memories and executable by the one or more processors to cause the UE to:
identify a dual connectivity configuration for a plurality of communication links, wherein at least one communication link of the plurality of communication links comprises a sidelink;
identify an activation of at least one additional sidelink carrier associated with a communication link of the plurality of communication links; and
transmit a report based at least in part on identifying the activation of the at least one additional sidelink carrier, the report including power headroom information for the sidelink.

23. The UE of claim 22, wherein the one or more processor-readable instructions are further executable by the one or more processors to cause the UE to:
establish a relay communication link between the UE and a relay network node, wherein the instructions to transmit the report are based at least in part on establishing the relay communication link.

24. The UE of claim 22, wherein the one or more processor-readable instructions are further executable by the one or more processors to cause the UE to:
receive a set of reference signals over one or more sidelink carriers associated with the sidelink; and
measure a set of path loss values based at least in part on the set of reference signals over the one or more sidelink carriers associated with the sidelink, wherein the instructions to transmit the report is based at least in part on the set of path loss values.

25. The UE of claim 24, wherein the one or more processor-readable instructions are further executable by the one or more processors to cause the UE to:
determine a minimum path loss value of the set of path loss values, wherein the instructions to transmit the report are based at least in part on the minimum path loss value.

26. The UE of claim 22, wherein the one or more processor-readable instructions are further executable by the one or more processors to cause the UE to:
determine a power backoff value for one or more sidelink carriers associated with the sidelink, wherein the instructions to transmit the report are based at least in part on the power backoff value for the one or more sidelink carriers associated with the sidelink.

27. A user equipment (UE) for wireless communication, comprising:
means for identifying a dual connectivity configuration for a plurality of communication links, wherein at least one communication link of the plurality of communication links comprises a sidelink;
means for identifying an activation of at least one additional sidelink carrier associated with a communication link of the plurality of communication links; and
means for transmitting a report based at least in part on identifying the activation of the at least one additional sidelink carrier, the report including power headroom information for the sidelink.

28. A non-transitory computer-readable medium storing code for wireless communication at a user equipment (UE), the code comprising one or more processor-readable instructions executable by one or more processors to:
identify a dual connectivity configuration for a plurality of communication links, wherein at least one communication link of the plurality of communication links comprises a sidelink;

identify an activation of at least one additional sidelink carrier associated with a communication link of the plurality of communication links; and transmit a report based at least in part on identifying the activation of the at least one additional sidelink carrier, the report including power headroom information for the sidelink.

* * * * *